H. BROWN.
APPARATUS FOR MEASURING THE QUANTITY OF EXPIRED AIR.
APPLICATION FILED MAR. 16, 1916.
1,271,523.
Patented July 2, 1918.
2 SHEETS—SHEET 1.
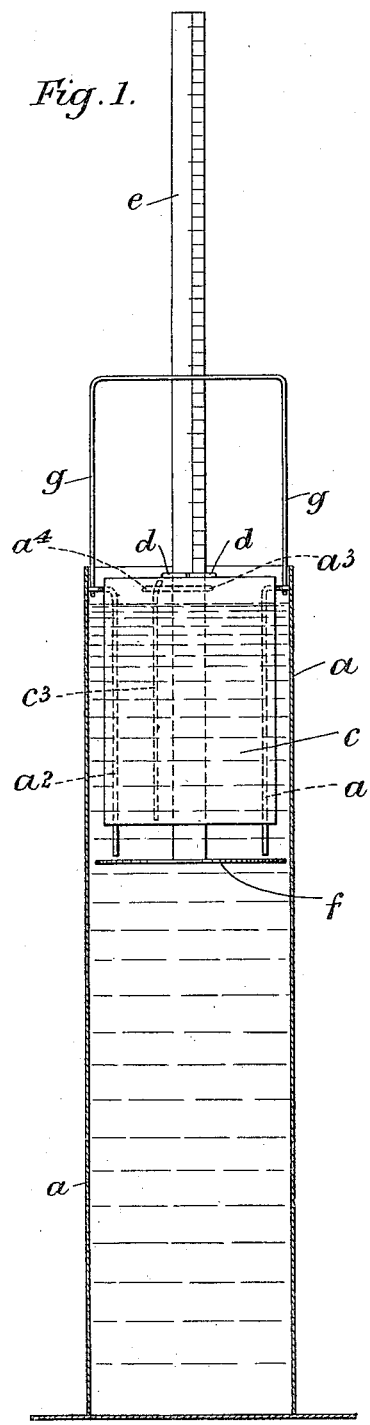
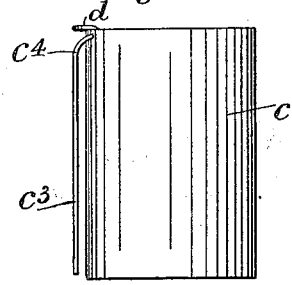
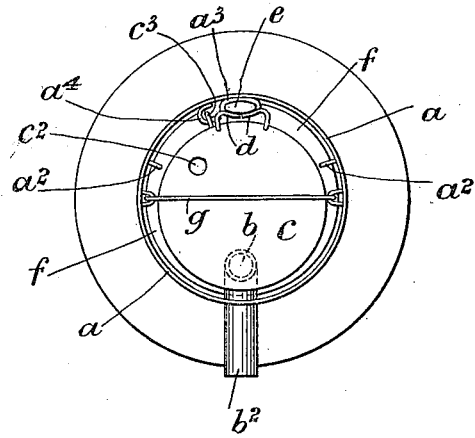
INVENTOR
Haydn Brown
BY
ATTORNEYS H. BROWN.
APPARATUS FOR MEASURING THE QUANTITY OF EXPIRED AIR.
APPLICATION FILED MAR. 16, 1916.
1,271,523.
Patented July 2, 1918.
2 SHEETS—SHEET 2.
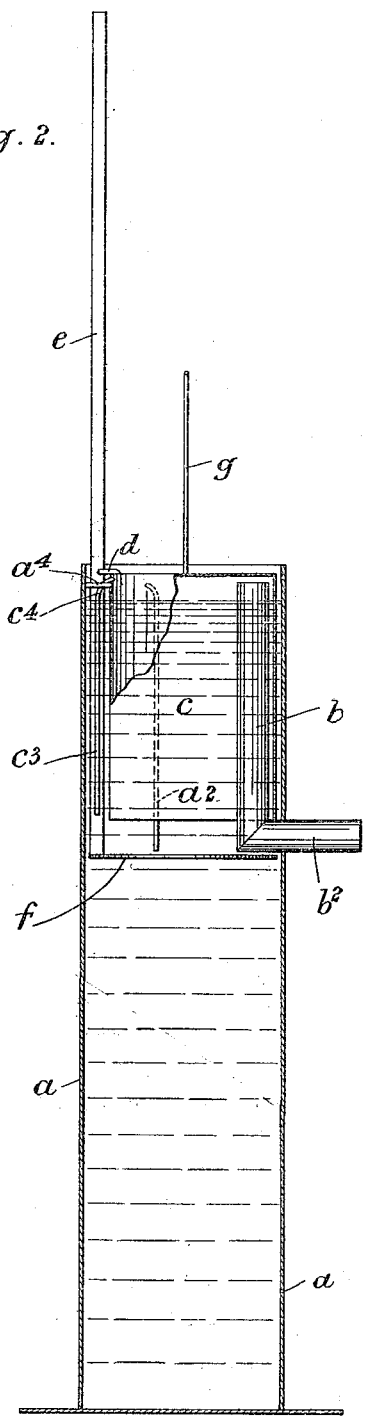
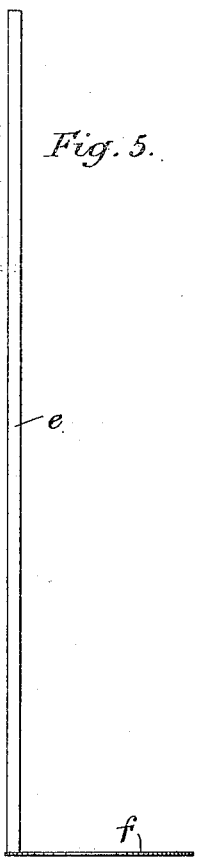
INVENTOR
Haydn Brown
BY
Simpson and Simpson
ATTORNEYS

UNITED STATES PATENT OFFICE.

HAYDN BROWN, OF CHISLEHURST, ENGLAND.

APPARATUS FOR MEASURING THE QUANTITY OF EXPIRED AIR.

1,271,523.     Specification of Letters Patent.     Patented July 2, 1918.

Application filed March 16, 1916. Serial No. 84,596.

*To all whom it may concern:*

Be it known that I, HAYDN BROWN, a subject of the King of Great Britain, residing at Manor Lodge, Chislehurst, in the county of Kent, England, have invented certain new and useful Improvements in Apparatus for Measuring the Quantity of Expired Air, of which the following is a specification.

My invention has reference to apparatus for testing the condition of the respiratory organs and measuring the quantity of expired air, the said apparatus being of the kind wherein two cylinders are used, one stationary and one capable of rising and falling in the other, each being closed at one end and the open end of one telescoping into the open end of the other so as to constitute an extensible receptacle, means being provided for admitting expired air into the said extensible receptacle and for permitting slower escape of the expired air therefrom and spring-actuated clockwork which, when the said receptacle is extended by expired air, is released so as to indicate how long the movable cylinder has been rising and, consequently, how much expired air, or for how long expired air, has been passed into the receptacle.

According to my invention I modify, simplify, and improve, such apparatus as follows:—

Instead of clockwork for the aforesaid purpose I use a scale connected with a body which will commence to gradually sink in liquid contained in the stationary cylinder, or the equivalent, when the use of the apparatus is started by expired air entering the movable cylinder, or the equivalent, and which will be arrested when the movable cylinder returns to its initial position, the starting and arresting of the said body, and the scale in connection therewith, being caused respectively by the starting and stopping of the movable cylinder, or the equivalent.

I will describe with reference to the accompanying drawings, a construction in accordance with my invention although it is to be understood that I do not limit myself to this precise construction.

Figures 1 and 2 are vertical sections at right angles to each other and Fig. 3 is a plan. Fig. 4 shows the movable cylinder separately and Fig. 5 shows separately the scale and attached body for sinking in the liquid as aforesaid.

The stationary cylinder $a$, containing liquid is supported upon its foot, or base, or in any other suitable way. A rigid tube $b$, is provided, the upper end opening above the level of the liquid in the said cylinder $a$, and the other end projecting, at $b^2$, for the reception of a flexible, or other suitable tube, by which air expired by the user is conducted into the apparatus. The movable cylinder $c$, can rise and fall in the liquid in the stationary cylinder $a$, it rising when expired air passes thereinto and descending when expired air ceases to be passed thereinto. The hole $c^2$, in the top of the cylinder $c$, allows of the escape of expired air at a less rate than the rate at which it enters through the pipe $b$. The said cylinder $c$, is shown as being guided by wires $a^2$, fixed to the cylinder $a$ and by a wire $c^3$ secured to the cylinder $c$, passing through an eye $a^4$, on the said cylinder $a$. The wire $c^3$, is so curved inwardly at the upper part $c^4$, that, when the cylinder $c$, is in its lowest position, a part such as the wire $d$ on the cylinder $c$, is caused to bear against a rod $e$, provided with a scale of depth but marked or calibrated so that it denotes the amount of air in the bell when the scale has sunk to a particular depth, for instance, cubic inches. When the cylinder $c$ commences to rise the said wire $c^3$ will cause the said cylinder to be moved away from the scale. The bottom of the rod $e$, is provided with a horizontal plate $f$, leaving a small space between its edge and the interior of the cylinder $a$. The rod $e$, preferably bears against a projection, or wire, attached to the inside of the cylinder $a$, as at $a^3$, to keep the said rod from frictional contact with the cylinder $a$, which might thus interfere with the normal descent of the rod and therefore give an incorrect final reading. The wire $d$, is shown as being cut through so that it can be easily bent outward, or inward, to give just sufficient bearing on the rod $e$, to retain it in position when the said wire comes into contact with the said rod. The wire $g$, serves to indicate the distance to which the upward movement of the cylinder $c$, should be limited.

When the apparatus is in use, the person whose respiratory powers are being tested will expire air into the cylinder $c$, through the tube $b$, and, as this takes place at a greater rate than it can escape through the hole $c^2$, the cylinder $c$, will rise and, as soon as this rising commences, the inwardly curved part $c^4$, of one of the wire guides will leave the eye $a^4$ and cause the cylinder to move sidewise whereupon the wire $d$, on the cylinder $c$, disengages the rod $e$, which will then begin to descend, the descent being gradual by reason of the space around the plate $f$, only allowing the liquid to pass gradually from beneath, to above, it. The cylinder $c$, will continue to rise, and be maintained raised, while air continues to be expired thereinto at a greater rate than it can escape through the hole $c^2$, and, while the said cylinder is raised, the rod $e$, will continue to descend gradually. When air ceases to be expired into the cylinder $c$, sufficiently to maintain it raised, the said cylinder will descend and, when it reaches its lowest position, the curved part $c^4$, of the wire $c^3$, will tilt the cylinder $c$, sufficiently to cause the wire $d$, to bear against the rod $e$, to prevent its further descent and then, by reference to the indication of the scale thereon, at the part on which the said wire bears, the amount of air which has been expired can be ascertained as it will be in accordance with the time during which the cylinder $c_1$ was raised as the scale rod is kept stationary unless the said cylinder is raised.

As aforesaid I do not confine myself to the precise details which I have described as they can be considerably varied. For example position and marking of the rod $e$; the manner of permitting the liquid to pass the plate $f$; the parts for guiding the cylinder $c$, and for starting and stopping the scale bar, or its equivalent, can be varied in many ways.

Having now particularly described and ascertained the nature of my said invention and in what manner the same is to be performed, I declare that what I claim is:—

1. In apparatus of the type described, a liquid container, a bell having its margin sealed by the liquid in the container, and having inlet and outlet means for the introduction of air into the bell to cause it to rise in the liquid and thereafter gradually descend by reason of the escape of the contained air through the outlet, a normally sinking member having associated therewith means for indicating by the distance it sinks when the bell is rising and descending the volume of air introduced into the bell, and means controlled by the bell for engaging said member when the bell is at rest in its lowermost position but freeing the same during the rising and descending movement of the bell, for the purpose described.

2. In apparatus of the type described, a liquid container, a bell having its margin sealed by the liquid in the container, and having inlet and outlet means for the introduction of air into the bell to cause it to rise in the liquid and thereafter gradually descend by reason of the escape of the contained air through the outlet, a normally sinking measuring rod having means for indicating by the distance it sinks while the bell is rising and descending the volume of air introduced into the bell and means controlled by the bell whereby it is engaged by the bell when the latter is in its lowermost position but is disengaged during the rising and descending movement of the bell, the said rod having at its lower end a substantial horizontal plate submerged in the liquid of the container and serving to retard the sinking motion of the rod when the latter is freed by the bell for the purpose described.

3. In apparatus of the type described, a liquid container, a bell having its margin sealed by the liquid in the said container, means through which air can be introduced into the said bell to lift the latter, said bell being provided with an outlet through which said air may escape to permit the bell to fall again, a normally sinking gage at least partially submerged in the liquid in the container and having associated means for indicating by the distance it sinks while the bell is rising and descending the volume of air introduced into the bell and means associated with the said bell and container for supporting the said gage only when the said bell is in its lowermost position.

4. In apparatus of the type described, a liquid container, a bell having its margin sealed by the liquid in the said container, means through which air can be introduced into the said bell to lift the latter, said bell being provided with an outlet through which said air may escape to permit the bell to fall again, a normally sinking gage and means on the said bell for supporting the said gage only when the bell is in its lowermost position.

5. In apparatus of the type described, a liquid container, a bell having its margin sealed by the liquid in the said container, means through which air can be introduced into the said bell to lift the latter, said bell being provided with an outlet through which said air may escape to permit the bell to fall again, a normally sinking gage having means for indicating by the distance it sinks while the bell is rising and descending the volume of air introduced into the bell and means associated with the said bell and container for causing the said bell to come into cramping engagement with the said gage as the said bell comes to rest.

In testimony whereof I have signed my name to this specification, in the presence of two subscribing witnesses.

HAYDN BROWN.

Witnesses:
G. F. TYSON,
EDW. GEO. DAVIES.

Copies of this patent may be obtained for five cents each, by addressing the "Commissioner of Patents, Washington, D. C."